United States Patent
Chrupalla et al.

(10) Patent No.: US 12,526,131 B2
(45) Date of Patent: Jan. 13, 2026

(54) DEVICE, METHOD AND PROGRAM FOR SECURE COMMUNICATION BETWEEN WHITE BOXES

(71) Applicant: BANKS AND ACQUIRERS INTERNATIONAL HOLDING, Paris (FR)

(72) Inventors: Nicolas Chrupalla, Andresy (FR); Nabil Hamzi, Cugy Vd (CH); Rémi Geraud, Valence (FR)

(73) Assignee: BANKS AND ACQUIRERS INTERNATIONAL HOLDING (FR)

( * ) Notice: Subject to any disclaimer, the term of this patent is extended or adjusted under 35 U.S.C. 154(b) by 268 days.

(21) Appl. No.: 18/016,374

(22) PCT Filed: Jul. 8, 2021

(86) PCT No.: PCT/EP2021/069068
§ 371 (c)(1),
(2) Date: Jan. 16, 2023

(87) PCT Pub. No.: WO2022/013072
PCT Pub. Date: Jan. 20, 2022

(65) Prior Publication Data
US 2023/0275745 A1 Aug. 31, 2023

(30) Foreign Application Priority Data

Jul. 15, 2020 (FR) .................................. 2007425

(51) Int. Cl.
*H04L 9/08* (2006.01)
(52) U.S. Cl.
CPC .......... *H04L 9/0819* (2013.01); *H04L 9/0866* (2013.01); *H04L 2209/16* (2013.01)
(58) Field of Classification Search
CPC .. H04L 9/0819; H04L 9/0866; H04L 2209/16
See application file for complete search history.

(56) References Cited

U.S. PATENT DOCUMENTS

| | | | |
|---|---|---|---|
| 2012/0121088 A1* | 5/2012 | Hata | H04L 9/085 380/255 |
| 2016/0211970 A1 | 7/2016 | Park | |
| 2016/0359618 A1* | 12/2016 | Kindarji | H04L 9/14 |
| 2018/0062828 A1* | 3/2018 | Cioranesco | H04L 9/0618 |

(Continued)

FOREIGN PATENT DOCUMENTS

EP    3035584 A1    6/2016

*Primary Examiner* — Cheng-Feng Huang
(74) *Attorney, Agent, or Firm* — Dilworth IP, LLC (57) ABSTRACT

A cryptographic data processing method for implementing a cryptographic function, implemented within an electronic data processing device including a processor, a memory and a set of cryptographic processing modules, the method including the following steps implemented by a current cryptographic processing module of the set: receiving incoming data; determining a decryption key to be applied to the incoming data according to a master key and a position of the current cryptographic processing module; decrypting the incoming data, with the key, delivering unencrypted incoming data; implementing at least one cryptographic operation on the unencrypted incoming data, delivering unencrypted outgoing data; optionally, determining a subsequent cryptographic processing module to be executed on the unencrypted outgoing data; obtaining an encryption key for the unencrypted outgoing data; encrypting the unencrypted outgoing data with the previously determined encryption key for the outgoing data, delivering the encrypted outgoing data, which may be intermediate data.

14 Claims, 3 Drawing Sheets

(56) References Cited

U.S. PATENT DOCUMENTS

2019/0007222 A1\* 1/2019 Noguchi .............. H04L 9/3278
2020/0266970 A1\* 8/2020 Rietman ............... G06F 7/764
2021/0185095 A1\* 6/2021 Harel ................... H04L 9/0894

\* cited by examiner

DEVICE, METHOD AND PROGRAM FOR SECURE COMMUNICATION BETWEEN WHITE BOXES

1. FIELD OF THE INVENTION

The invention relates to the field of data protection. More particularly, the invention relates to the field of data exchange protection when executing routines. Even more specifically, the invention relates to the field of the protection of data exchanged between cryptographic primitive execution modules when executing an application within a single data processing device.

2. BACKGROUND OF THE INVENTION

One object of cryptography is to have algorithms and protocols to protect a communication channel against data capture attempts. There are two main systems: the so-called "black box" systems and the so-called "white box" systems. In a "black box" system, it is considered that the information "source" and the information "destination" are secure: an attacker can only access the inputs/outputs of the source and/or of the destination but cannot access the encryption and decryption algorithm itself, which is executed inside a secure object that the attacker cannot access, called a black box. However, from the industrial point of view, the main problem is the practical implementation of techniques developed in laboratories. Thus, protocols deployed in the wrong context, algorithms implemented incorrectly or unsuitable parameters may provide an additional entry point for the attackers.

The problem of practical implementation is even more complex when the black box attack model is no longer satisfied: the attacker can then obtain access to a certain amount of information concerning the operation of the encryption/decryption processes inside the black box. In addition, with the deployment of cryptography in applications which are executed on open devices such as PCs, tablets and smartphones, without necessarily using secure elements, the problem no longer arises in terms of black box, but on the contrary in terms of white box.

Cryptographic white boxes are software components which execute cryptographic operations with a built-in secret key (hard-coded or transmitted dynamically). White boxes are designed so that the secret is difficult to recover, both in the traditional meaning of cryptanalysis, but also faced with opponents capable of accessing the software internal components (for example the memory, the accesses to the cache, the source code, etc.) or even of modifying the encryption software or its behaviour.

Thus, the attacker of a white box potentially has full access to the software implementation of a cryptographic algorithm: it is assumed that the binary code can be seen and modified by the attacker and that the attacker has full control over the execution platform (CPU calls, memory registers, etc.). Consequently, implementing the encryption algorithm is one of the only barriers providing protection against an attack. Thus, the software implementations which withstand these white box attacks are called white-box implementations. They consist of applications in which a cryptographic key is used to protect goods or services, for example in the field of DRMs. In such cases, it may be useful for the attacker to reverse engineer the application and extract the key therefrom (hence the need for white boxes with dynamically supplied keys). Similar attacks may occur to the disadvantage of the user, for example when a banking application is executed on a device infected by malware or on a system in which some users have higher privileges than others. In such situations, when the cryptographic operations are implemented using standard cryptographic libraries (known and documented) such as OpenSSL or when the cryptographic keys are simply stored in the memory, the secret key will be discovered, irrespective of the strength of the cryptographic primitive used.

In addition, even if the attacker is unable to obtain the secret key, they can nevertheless try to exploit the white box by using it as is to perform encryption or decryption operations, using a code lifting attack. In this attack, the attacker does not try to extract the secret key from the implementation, but uses the entire application as a passport to implement cryptographic functions. The white-box features are exploited directly as such. In practice, it is possible to fight against code lifting by applying external codes to the original system, and in particular annihilating codes at other locations in the main application. Process obfuscation or isolation techniques must nevertheless be used in a secure environment (in a terminal, PC, tablet) to make sure that the G and F functions cannot be extracted from the calling function. Consequently, a secure component is required, which is not always possible.

In addition, another problem concerns the white-box code execution sequencing. In fact, assuming that the white-box implementation is carried out efficiently, and that a limited number of cryptographic functions are built into the white box (ideally only one function is built into a white box), in some cases, the attacker could nevertheless obtain intermediate data, in other words data forming the output of a first white box and the input of a second white box. In this way, the attacker can implement all or part of a security chain, on their own behalf, by modifying the intermediate data, without having to inspect the operations of the white boxes.

3. SUMMARY OF THE INVENTION

The invention is not subject to the above-mentioned problems. More particularly, the invention avoids firstly the code lifting practices and secondly the exposure of intermediate data.

Cryptographic data processing method for implementing a cryptographic function, which method is implemented within an electronic data processing device comprising a processor, a memory and a set of cryptographic processing modules, the method comprising the following steps implemented by a current cryptographic processing module from the set of cryptographic processing modules, the current cryptographic processing module belonging to a chain of at least two cryptographic processing modules executed for the implementation of the cryptographic function:

receiving incoming data;
determining a decryption key to be applied to the incoming data;
decrypting, with the key for the incoming data, delivering unencrypted incoming data;
implementing at least one cryptographic operation on the unencrypted incoming data, delivering unencrypted outgoing data;
optionally, determining a subsequent cryptographic processing module to be executed on the unencrypted outgoing data;
obtaining an encryption key for the unencrypted outgoing data;

encrypting the unencrypted outgoing data with the previously determined encryption key for the outgoing data, delivering the encrypted outgoing data, which may be intermediate data.

Thus, the invention prevents the intermediate data transiting between two cryptographic processing modules from being intercepted and used by an attacker.

According to a special characteristic, the decryption step which, with the incoming data key, delivers unencrypted incoming data, comprises a step of combining the incoming data with at least one table of a series of tables built into the cryptographic processing module.

According to a special characteristic, the step of determining a decryption key to be applied to the incoming data comprises a step of deriving the decryption key from a master key, the deriving step taking into account a position of the current cryptographic processing module in the chain of cryptographic processing modules.

Thus, it is not easy, for an attacker, even knowing a master key, to determine which will be the next cryptographic processing module used in the chain. This information depends in fact directly on the (incoming/outgoing) data itself which is encrypted.

According to a special characteristic, the step of determining a subsequent cryptographic processing module to be executed on the unencrypted outgoing data comprises:
  A step of identifying, in the unencrypted incoming data, a routing data structure;
  A step of determining, from the routing data structure, a current location;
  A step of determining, from the current location, a subsequent location;
  A step of obtaining an identifier of the subsequent cryptographic processing module associated with the subsequent location.

Thus, the sequencing of the cryptographic processing modules depends on the data which is itself encrypted and the module can determine, potentially on its own, which is the next module to be executed in the sequencing depending on this data. The dynamic routing obtained is therefore more difficult to analyse for an attacker.

According to a special characteristic, the step of obtaining an encryption key for the unencrypted outgoing data comprises a step of deriving the encryption key from a master key, the deriving step taking into account a position of the subsequent cryptographic processing module in the chain of cryptographic processing modules.

Thus, it is not easy, for an attacker, even knowing a master key, to determine which will be the next cryptographic processing module used in the chain. This information depends in fact directly on the (incoming/outgoing) data itself which is encrypted.

According to a special characteristic, the step of obtaining an encryption key for the unencrypted outgoing data comprises a step of obtaining the encryption key from the identifier of the subsequent cryptographic processing module.

Thus, the current module can use the identifier of the subsequent module to select a key which, a priori, it knows is suitable for the subsequent module.

According to a special characteristic, the process further comprises a step of transmitting encrypted outgoing data to a subsequent cryptographic processing module in the chain of at least two cryptographic processing modules depending on at least one routing data item present in the incoming data and/or the unencrypted incoming data.

Thus, the current module does not rely on the activation of a mechanism for returning to a caller the data it has just processed, but on the contrary can supply the intermediate data directly to a subsequent module so that the data is processed directly. The overall security is therefore increased.

According to a special characteristic, the step of implementing at least one cryptographic operation on the unencrypted incoming data, delivering unencrypted outgoing data, consists in applying a cryptographic primitive.

Thus, such a primitive is implemented in a secure manner.

According to a special embodiment, the invention consists of a cryptographic data processing device to implement a cryptographic function. Such an electronic data processing device comprises a processor, a memory and a set of cryptographic processing modules. The device comprises a current cryptographic processing module from the set of cryptographic processing modules, the current cryptographic processing module belonging to a chain of at least two cryptographic processing modules executed for the implementation of the cryptographic function, the current cryptographic processing module comprising:
  Means for receiving incoming data;
  Means for determining a decryption key to be applied to the incoming data;
  Means for decrypting, with the key for the incoming data, delivering unencrypted incoming data;
  Means for implementing at least one cryptographic operation on the unencrypted incoming data, delivering unencrypted outgoing data;
  Optional means for determining a subsequent cryptographic processing module to be executed on the unencrypted outgoing data;
  Means for obtaining an encryption key for the unencrypted outgoing data;
  Means for encrypting the unencrypted outgoing data with the previously determined encryption key for the outgoing data, delivering the encrypted outgoing data, which may be intermediate data.

According to a preferred implementation, the various steps of the methods according to the invention are implemented by one or more computer software packages or programs, comprising software instructions to be executed by a data processor of an execution device according to the invention, and being designed to control the execution of the various steps of the methods, implemented on the communication terminal, the execution electronic device and/or the control device, according to the distribution of the processes to be performed and determined by a scripted source code.

The invention therefore also relates to programs, likely to be executed by a computer or a data processor, these programs comprising instructions to control execution of the steps of the methods as mentioned above.

A program can use any programming language and may take the form of a source code, an object code, or an intermediate code between source code and object code, as in a partially compiled form, or in any other desirable form.

The invention also relates to an information medium that can be read by a data processor and comprising instructions of a program as mentioned above.

The information medium can be any entity or device capable of storing the program. For example, the medium can comprise a storage means, such as a ROM, for example a CD ROM or a microelectronic circuit ROM, or a magnetic recording means, for example a mobile medium (memory card) or a hard disk or an SSD.

In addition, the information medium can be a transmissible medium such as an electrical or optical signal, that can be routed via an electrical or optical cable, by radio or by other means. The program according to the invention can be downloaded in particular on an Internet type network.

Alternatively, the information medium can be an integrated circuit incorporating the program, the circuit being adapted to execute or to be used in the execution of the method concerned.

According to one embodiment, the invention is implemented using software and/or hardware components. In this context, the term "module" can correspond in this document to a software component, a hardware component or a set of hardware and software components.

A software component corresponds to one or more computer programs, one or more sub-programs of a program, or more generally to any element of a program or software package adapted to implement a function or a set of functions, as described below for the module concerned. Such a software component is executed by a data processor of a physical entity (terminal, server, gateway, set-top-box, router, etc.) and may need to access the hardware resources of this physical entity (memories, recording media, communication buses, input/output electronic boards, user interfaces, etc.).

Similarly, a hardware component corresponds to any element of a hardware set adapted to implement a function or a set of functions, as described below for the module concerned. It may consist of a hardware component that is programmable or has a built-in processor to execute software, for example an integrated circuit, a smart card, a memory card, an electronic card to execute firmware, etc.

Obviously, each component of the system described above implements its own software modules.

The various above-mentioned embodiments can be combined together to implement the invention.

4. BRIEF DESCRIPTION OF THE DRAWINGS

Other characteristics and advantages of the invention will appear more clearly on reading the description which follows of a preferred embodiment given as a simple illustrative and non-limiting example, and referring to the attached drawings, in which.

5. DETAILED DESCRIPTION OF THE INVENTION

5.1. Reminder of the Principle

Figure 1:
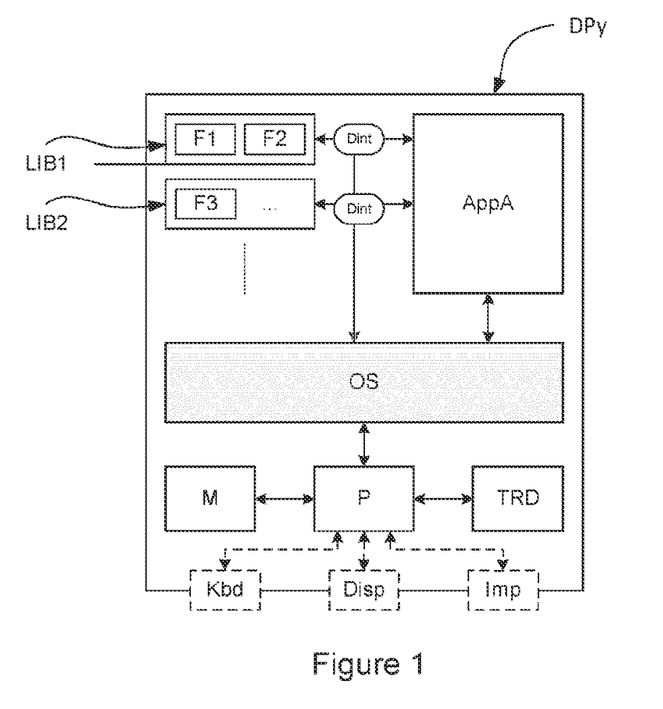
FIG. 1 describes a system in which the invention can be implemented.

As explained previously, the general principle of the invention consists in equipping each cryptographic primitive execution module with an additional encryption layer at the input and output of the execution module, in the framework of a sequence of "unitary" module calls to perform one or more cryptographic (sub)-functions predetermined by the calling application, using a sequencing mechanism, of which some embodiments, according to the invention, are described below. A typical example of implementing the technique described in relation with FIG. 1 is performed in a system comprising a calling computer program (AppA) (such as an application running on an operating system (OS) such as Windows™, MacOS™, Linux™ or Android™), itself running on a physical device (DPy). An electronic device (DPy) comprises a processor (P), a memory(M), and data transmission means (TRD). These data transmission means (TRD) may take several forms, as explained below. It may also comprise, depending on the embodiments, (optional) hardware and/or software display (Disp), entry (KBD) and/or printing (IMP) components.

The application may for example consist of a music/video player, a payment application or an application managing the access to sensitive data saved on the electronic device, an identification or authentication application, etc. When it is executed, this computer program (AppA) needs to implement one more cryptographic function (F1, F2, F3, etc.). These functions are not generally built directly into the computer program. Instead, the program calls functions which are available in a library (LIB1, LIB2, etc.) (.lib, .dll, etc. depending on the operating system). This library is loaded by the calling program (AppA), which then calls the cryptographic function or the cryptographic primitive required in white box (F1, F2, F3, etc.), either directly or via the operating system (OS). This cryptographic function or this cryptographic primitive is generally called as such and when two cryptographic functions or two cryptographic primitives (each in white box) are called one after the other, the intermediate data DInt (i.e. output from the first white box and supplied to the second white box) transits in unencrypted format, as explained previously. The technique proposed solves the problem of intermediate data transiting in unencrypted format while limiting the possibilities of code lifting, dividing the functions provided by a white box, encrypting (masking) the inputs/outputs of the modules and dynamically routing the execution of the various modules together, as explained in FIG. 2. So that this description is as exhaustive as possible, a reminder of the following definitions is provided below:

A cryptographic primitive is a low-level cryptographic algorithm, used to build in particular a security system. A cryptographic algorithm may refer to a cryptographic hashing function (for example SHA-1, SHA3, etc.) or an encryption function (for example AES, DES);

A cryptographic primitive uses cryptographic operations (permutation, rotations, linear transformations, algebraic operations on integers or binary numbers, additions, multiplication, XOR, etc.);

A cryptographic function comprises the implementation of one or more cryptographic primitives depending on a sequencing (routing) defined by the author of the cryptographic function, depending on the purpose of the cryptographic function (i.e. what is the purpose of this function, will it be part of a security architecture).

Figure 2:
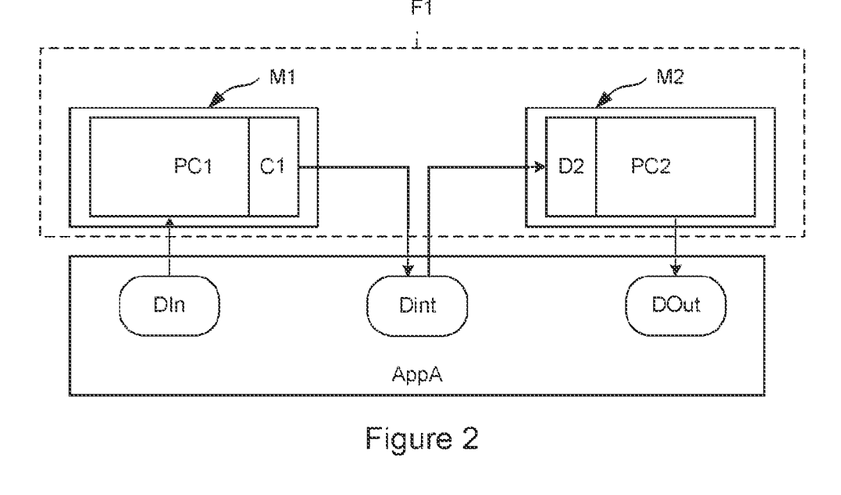
FIG. 2 describes the general principle of the method object of the invention.

Thus, FIG. 2 describes a mechanism in which a cryptographic primitive (Pc1) and a cryptographic primitive (Pc2) are used to implement a cryptographic function (F1), by the calling application (AppA), in the context of the system shown on FIG. 1. According to the proposed technique, each cryptographic primitive is implemented in a dedicated module (M1, M2). The application AppA supplies incoming data (Din) to the module M1, then obtains intermediate data (Dint) which is transmitted, as incoming data, to the module M2 which then uses the intermediate data to produce the outgoing data (DOut). According to the invention, the module M1 comprises an output stage C1 which encrypts the intermediate data (Dint) before communicating it to the application AppA. According to the invention, the module M2 comprises an input stage D2 which decrypts the intermediate data (Dint) before using it in the context of the primitive PC2.

The technique proposed firstly solves a problem of disclosing intermediate data when data is exchanged between modules and this data temporarily leaves the secure environment provided by the module: it could be intercepted by an attacker at this precise time. The "intermediate data" could be accessible to an attacker when it transits outside the module environment. In addition, as explained previously, an attacker may take a module out of its context and use it (for example as an independent decryption primitive) elsewhere.

The invention removes the contradiction generated by the actual principle of "white box" and "code lifting", according to a new implementation axis: to make a white box more efficient, theoretically, the cryptographic functions must be grouped together inside a single white box. On the contrary, to limit the risks due to code lifting, the cryptographic primitives must be separated from each other as much as possible.

Thus, although in principle it would be possible to group more than one cryptographic primitive in a single white box, instead of considering several different white boxes, in practice, according to the inventors, this is neither feasible nor desirable. The process of including a program in a white box considerably increases its size (due to the transformation of functions into tables) and grouping several cryptographic primitives in a single white box, apart from the fact that this raises a security problem, rapidly increases the code bases, which then become difficult to manage. Several different and incompatible white box technologies (since coming from different editors for example) are sometimes used in a single program or a single application, in which case they cannot be grouped together.

Thus, a method to increase the security is proposed, in particular by implementing white boxes, by securing the data transiting (intermediate data) between the modules, while guaranteeing a correct execution flow (thus providing protection against code lifting attacks). As part of this invention, it is generally considered that a module is implemented as a library (software) or a dedicated component (hardware) and that this module implements, at most, a cryptographic primitive (and possibly only part of a cryptographic primitive).

According to the invention, in an application comprising at least two modules in white boxes, each implementing only part of a global data protection cryptographic function, the current module is provided with a function to "mask" data with the subsequent module. For example, when two modules implement part of a function which involves transmitting intermediate data between the two modules, the intermediate data is then masked (i.e. encrypted for example) so that information obtained by knowing this intermediate data cannot be used correctly. In a special embodiment, masking consists in encrypting the intermediate data before transmitting it to the subsequent module, so that ideally this intermediate data cannot be accessed, or at least cannot be used, even for the calling application.

Figure 3:
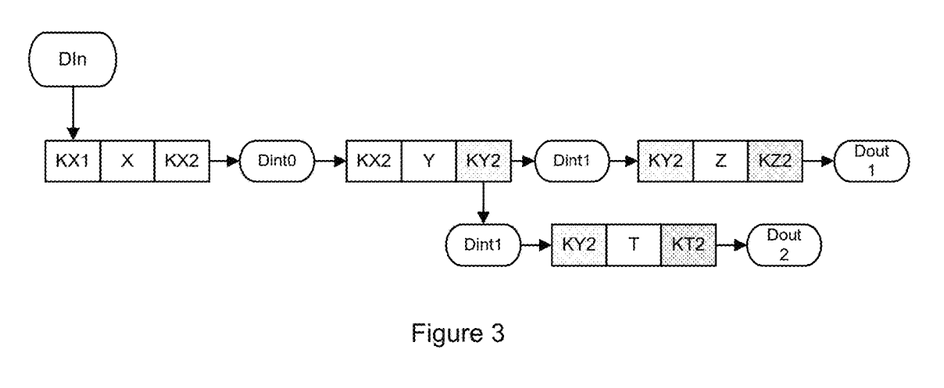
FIG. 3 illustrates another example of the method object of the invention.

Another example comprising four modules (X, Y, Z, T) is described in relation with FIG. 3. The technical solution proposed in this invention consists in using pairs of corresponding codes between modules. In concrete terms, this means that in module X, a (single) encryption capacity (for a key KX2) and a decryption capacity (for a key KX2) are added. The same process is carried out for the modules Y, Z and T. The intermediate data Dint0 and Dint1 is encrypted (and/or masked). The routing mechanism can be either internal to the modules, performed according to an input variable or a header field of the incoming data (Din) and of the intermediate data (Dint0 and Dint1). Alternatively, the routing mechanism can be implemented by the calling application or by a specific routing module.

This ensures that:
the data transmitted between the modules is always encrypted, and therefore not easily accessible, not only for an attacker but also for the calling application itself;
the flow of intermediate data cannot be modified (for example by code lifting), otherwise the intermediate data decryption step will not supply a usable result (when input into the subsequent white box);
code lifting cannot be easily implemented over the entire chain of modules, due to the dispersion of the call logic which is in fact distributed between several different "players", including the "modules" themselves, which may transmit the information to a different caller.

In other words, according to the invention, in addition to protecting the intermediate data, the invention also protects the execution logic of firstly the cryptographic primitives and secondly the cryptographic functions. One or more modules of the plurality (set) of modules can also implement differentiated call mechanisms and intermediate data routing mechanisms, as required. Potentially, all the modules in the set of modules can implement routing mechanisms.

Figure 4:
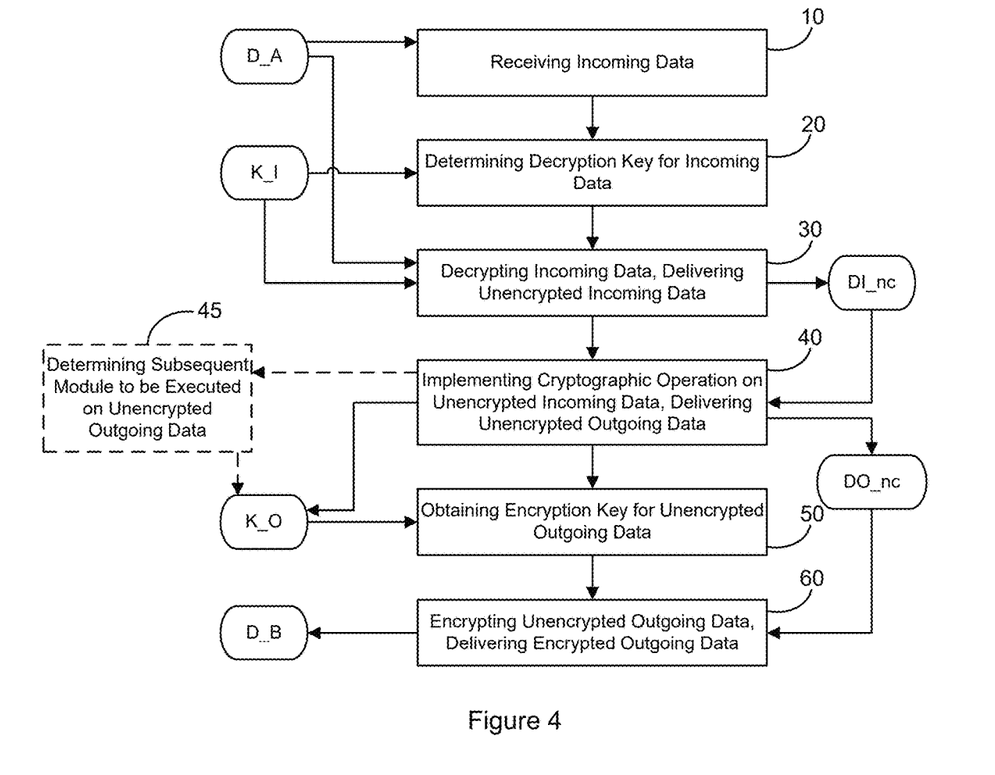
FIG. 4 describes the various steps of an embodiment of the method of the invention.

The steps implemented in a module are therefore as follows, described in relation with FIG. 4:
receiving (10) incoming data (D_A);
determining (20) a decryption key (K_I) to be applied to the incoming data (D_A);
decrypting (30), with the key (KI) for the incoming data (D_A), delivering unencrypted incoming data (DI_nc);
implementing (40) at least one cryptographic operation on the unencrypted incoming data (Di_nc), delivering unencrypted outgoing data (DO_nc);
optionally, determining (45) a subsequent module to be executed on the unencrypted outgoing data (depending on the routing mechanism used);
obtaining (50) an encryption key (K_O) for the unencrypted outgoing data (DO_nc) (optionally, depending on the subsequent module when an internal routing mechanism is used and a key conditional determination is implemented);
encrypting (60) the unencrypted outgoing data (DO_nc) with the previously determined encryption key (K_O) for the outgoing data, delivering the encrypted outgoing data (D_B), which may be intermediate data.

According to the invention, the decryption 30 and encryption 60 steps are mutually optional: depending on the position of the module in the chain of modules, one of these steps (and its dependent steps of obtaining keys) may not be implemented. However, at least one of the two steps (encryption or decryption) must be implemented. More specifically, if the module is the first one in the chain, there is no need to decrypt the incoming data; if the module is the last one in the chain (delivering final outgoing data, in other words not intermediate data), the step of encrypting this outgoing data is optional.

Thus, according to the invention, it is possible, firstly, to completely mask the data transiting between the modules by encrypting it and, secondly, to determine, in a current module, the subsequent module to which the outgoing data must be transmitted and to use a suitable key to encrypt this data before transmission. The corollary of such an implementation according to the invention is that the implementation of a cryptographic primitive or of a cryptographic function (comprising several cryptographic primitives) is more or less significantly extended.

In addition, determination of a decryption key (K_I) and of an encryption key (K_O) is implemented depending on the operational conditions (in particular the need to perform such an encryption or decryption operation) and is executed according to a determination methodology as described below, for example depending on a basic, initial key, called a master key, whose form varies depending on the embodiments.

According to the invention, in one embodiment, routing between the modules is carried out using a specific field of the incoming data. More specifically, two concrete possibilities are implemented:

the first consists in using an incoming data header, this header not being encrypted in the same way as the incoming data. The header is encrypted or masked according to a different process in each module, but irrespective of the process used, each module can decode or decrypt this header.

The advantage in this case is that it is possible to obtain a key to decrypt the encrypted incoming data according to the header value. The header thus performs two separate and complementary functions: a function to determine an encryption key, to obtain this key dynamically, and a routing function to encrypt the outgoing data with a key, also obtained dynamically, and to determine the subsequent module in the data processing chain.

the second consists in hiding this field in the encrypted incoming data itself, at a position known by the current module and the previous module. The value of this field is not known before the data is decrypted by the current module.

The advantage in this case is that there is no need to obtain "variable" encryption keys. More particularly, the module knows which decryption key must be used to decrypt the incoming data. Consequently, there is no need to determine this key according to the header value and it is therefore possible to reduce the size of the module binary code (and the execution time). Once the incoming data has been decrypted, the value of the specific field is known. The routing function is then implemented, after applying the cryptographic function of the module, as previously (i.e. the value of the field used to encrypt the outgoing data with an encryption key, obtained dynamically, and to determine the subsequent module in the data processing chain).

Irrespective of how this field is used, it can be used to transfer the call routing functions of the various modules to the modules themselves. Consequently, each module can potentially call every other module in the set of modules. This is a smart way of masking the calls and the data, for several reasons.

In the traditional implementation in white box, all the cryptographic functions are implemented in the white box, using a known and open process, providing an opportunity for code lifting. When the white box implements several known encryption and/or decryption functions, they are wired together, in one way or another, in the white box.

In this case, the approach is quite different since the execution flow is not known in advance. It is the value of the routing field which is used to execute cryptographic primitives or cryptographic operations in modules whose sequencing is not known within the modules themselves. A current module, at a time "t", is only informed of the minimum required, i.e. the incoming data decryption key, the subsequent module to be called and the outgoing data encryption key corresponding to this subsequent module to be called. Thus, for example, if the current module only implements an "XOR" type cryptographic operation, the current module:

Decrypts the incoming data supplied;
Applies the XOR operation to this incoming data supplied, delivering the outgoing data;
Determines, using the value of the routing field, the encryption key to be applied;
Encrypts the outgoing data;
Identifies, using the value of the routing field, the subsequent module;
Transmits the encrypted outgoing data to the subsequent module.

Obviously, the above description given for the XOR operation is also valid for any other cryptographic operation, whether applied on bit chains, byte chains or integers (fixed or variable permutations, masking, shifts, rotation, additions, etc.)

One advantage of such an implementation is to potentially allow a given module in the set of modules to be called several times to implement a cryptographic primitive (several masking, shift operations, etc.) or a cryptographic function (several calls of a given primitive).

Although described in relation with the implementation of a single cryptographic operation, it is obvious that each module may, depending on the operational implementation conditions, implement several cryptographic operations (for example, but not only, when cryptographic operations are frequently connected together, or when such groupings are justified).

Advantageously, the incoming and outgoing keys are obtained dynamically: the aim is to avoid keeping a key permanently in a module, since this module could then be used by a potential attacker for any purpose whatsoever. However, this way of doing things is not mandatory since it is pointed out that the modules are implemented sequentially or iteratively so as to produce a complete cryptographic function, which may include obtaining one or more encryption keys, also dynamically.

Ideally, the operations to encrypt the outputs and decrypt the inputs which are implemented in the various modules during their execution, are simple and fast, to avoid overloading the modules with code that is "unnecessary" for the actual implementation of the cryptographic primitive or the cryptographic operation. The aim is to increase the security of the incoming and outgoing data without excessively increasing the size of the code and without excessively increasing the time required to implement the cryptographic function. A compromise must therefore be made between the advantage of a protection and the execution speed. Thus, for example, encryption/decryption may include only a few cryptographic operations (for example two to six), implemented on a bit chain, a byte chain or an integer, these cryptographic operations being symmetrical: the decryption operations are the opposite of the encryption operations, and vice versa, for two modules routed together. In this case, the encryption keys consist of a sequence (series) of variable length of unitary encryption operations.

As a purely illustrative example, if the encryption of the outgoing data includes, in a module X, a permutation (operation S1), followed by an addition (operation S2), followed by another permutation (operation S3), the decryption of the incoming data corresponding to this outgoing data, in the module Y, which is the next one in the routing, includes: a permutation (operation E1, the reverse of operation S3), a subtraction (operation E2, the reverse of operation S2), and another permutation (operation E3, the reverse of operation S1). In this case, the encryption key consists of the triplet {S1; S2; S3} and the decryption key consists of the triplet {E1; E2; E3}. In this case, the encryption and decryption keys correspond to secret sequences (series) of unitary encryption operations.

The complexity of the outgoing data encryption and incoming data encryption operations depends mainly on the number of useful cryptographic operations implemented in the module. For example, when the module comprises only one or two useful cryptographic operations (a useful cryptographic operation is a cryptographic operation of the module which is used to process the data to implement the cryptographic primitive), the encryption or decryption operations included in this module are generally simpler and faster. On the contrary, if the module implements an entire cryptographic primitive, such as AES or 3DES (and therefore comprises numerous useful cryptographic operations), then the encryption or decryption operations included in this module may be more complex and longer and include a complete implementation based on longer and more complex keys.

Depending on the embodiments, note that the first module of a chain does not necessarily require an encryption operation and the last module of a chain does not require a decryption operation. (An encryption (respectively decryption) operation can be carried out in these steps, but this does not necessarily provide additional protection.)

The corresponding keys used in the incoming data decryption and outgoing data encryption operations can be chosen manually or automatically; one way of obtaining these keys is to use a key derivation function (such as HKDF) from a master key. In an implementation of the invention with a linear sequence of modules numbered [0, 1, 2, 3, . . . , n], the encryption key for module i (which is the decryption key of module i+1) can be derived as HKDF (seed, i), the seed being for example the key used for the previous module (i−1), an independent master key, an initial parameter, etc. The advantage of this implementation from a derivable master key is that it is simpler and more efficient than an arbitrary selection of keys for each module. In addition, another advantage is that the initial master key can vary each time the set of modules is called. Other implementations are possible, such as for example in the case of series of unitary operations described previously, a derivation of the subsequent series according to the previous series and the module identifier.

In addition to or independently from the previous implementations, several encryption/decryption keys can be used in each module. In this case, an input variable indicates the key to be considered. Such an implementation allows intelligent routing, by ensuring that in a first given situation, a first encryption (respectively decryption) is used, while in a second given situation, a second encryption (respectively decryption) is used.

Several different encryption keys can also be considered, one in each module, without specifically having a link between the way the encryption keys are chosen for each module.

In a special embodiment, when a module includes an entire cryptographic primitive, the outgoing data encryption (respectively incoming data decryption) procedure implements all or part of the cryptographic primitive itself, when this is possible. In other words, since, according to the invention, the objective of a module is to hide the key (and not the implementation of the encryption algorithm itself), this implementation is used, with a different key, to encrypt the outgoing data (respectively decrypt the incoming data). Thus, the additional code volume is relatively limited.

As indicated previously, adding extra code for encryption/decryption increases the size of the modules (compared with a standard implementation). However, this extra code is compensated, according to the invention, by the greater flexibility and modularity provided by the ability to decompose cryptographic operations or cryptographic primitives in complete security, using the technique described. In addition, it is possible to take advantage of lightweight cryptographic schemes (for example Trivium, Simon, etc.) of small code size and good calculation efficiency, to compensate for the code overload due to the implementation of the technique proposed.

In a special embodiment of the invention, the call procedures and the procedures used to route the data between modules can, as described previously, be implemented by the modules themselves which, as the tasks under their responsibility are executed, apply data routing on the data they have received and processed. In another embodiment, it is also possible to have a specific module (called routing module) which implements this routing, through the use of special encryption mechanisms. In this case, it is a bridging module, which is an intermediate between the calling application and the modules performing the cryptographic functions.

5.2. Other Characteristics and Advantages

Figure 5:
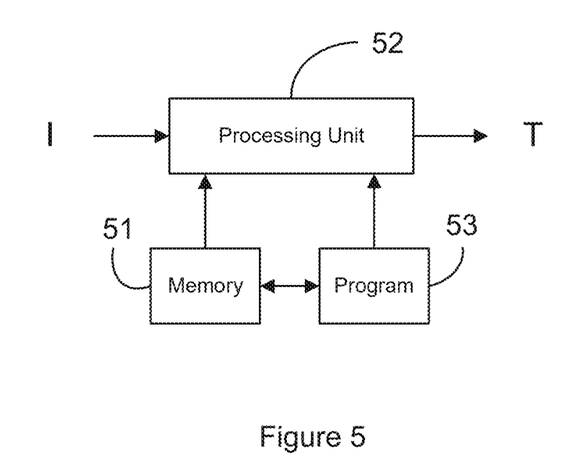
FIG. 5 illustrates an architecture of a calling device adapted to implement a processing method of the invention.

We will now describe, in relation with FIG. 5, a simplified architecture of an execution electronic device adapted to process and execute code according to the method described previously. An execution electronic device comprises a memory 51 (and/or possibly secured and/or two separate memories, one secured and the other not), a processing unit 52 equipped for example with a microprocessor (and/or possibly secured and/or two separate processors, one secured and the other not) and controlled by the computer program 53, implementing the method as described previously. In at least one embodiment, the invention is implemented at least partially in the form of an application AppA installed on this device. We therefore have a cryptographic data processing device to implement cryptographic functions, which comprises a processor (52), a memory (51) and a set of cryptographic processing modules (53), implemented in a program. The device implements a current cryptographic processing module from the set of cryptographic processing modules, the current cryptographic processing module belonging to a chain of at least two cryptographic processing modules executed for the implementation of the cryptographic function, the current cryptographic processing module comprising:

Means for receiving incoming data;
Means for determining a decryption key to be applied to the incoming data;
Means for decrypting, with the key for the incoming data, delivering unencrypted incoming data;
Means for implementing at least one cryptographic operation on the unencrypted incoming data, delivering unencrypted outgoing data;
Optional means for determining a subsequent cryptographic processing module to be executed on the unencrypted outgoing data;

Means for obtaining an encryption key for the unencrypted outgoing data;

Means for encrypting the unencrypted outgoing data with the previously determined encryption key for the outgoing data, delivering the encrypted outgoing data, which may be intermediate data.

To execute the functions under its responsibility, the device also comprises means for implementing all the steps mentioned previously, either in hardware form, when specific components are dedicated to these tasks, or in software form in relation with one or more microprograms running on one or more processors of the execution device.

The invention claimed is:

1. A cryptographic data processing method for implementing a cryptographic function, which method is implemented within an electronic data processing device comprising a processor, a memory and a set of cryptographic processing modules, the method comprising the following steps:
   receiving, by a current cryptographic processing module from the set of cryptographic processing modules, incoming data (D_A), the current cryptographic processing module belonging to a chain of at least two cryptographic processing modules executed for the implementation of the cryptographic function;
   determining, by the current cryptographic processing module, a decryption key (K_I) to be applied to the incoming data (D_A) according to a master key and a position of the current cryptographic processing module;
   decrypting, by the current cryptographic processing module, the incoming data (D_A) with the key (K_I), delivering unencrypted incoming data (DI_nc);
   implementing, by the current cryptographic processing module, at least one cryptographic operation on the unencrypted incoming data (Di_nc), delivering unencrypted outgoing data (DO_nc);
   obtaining, by the current cryptographic processing module, an encryption key (K_O) for the unencrypted outgoing data (DO_nc);
   encrypting, by the current cryptographic processing module, the unencrypted outgoing data (DO_nc) with the previously determined encryption key (K_O) for the outgoing data, delivering the encrypted outgoing data (D_B), which may be intermediate data.

2. The method according to claim 1, characterised in that the step of decrypting, with the key (K_I) for the incoming data (D_A), delivering the unencrypted incoming data (DI_nc), comprises a step of combining the incoming data with at least one table of a series of tables built into the cryptographic processing module.

3. The method according to claim 1, characterised in that the step of determining the decryption key (K_I) to be applied to the incoming data (D_A) comprises a step of deriving the decryption key (K_I) from the master key, the deriving step taking into account a position of the current cryptographic processing module in the chain of cryptographic processing modules.

4. The method according to claim 1, further comprising a step of determining a subsequent cryptographic processing module to be executed on the unencrypted outgoing data, characterised in that the step of determining the subsequent cryptographic processing module to be executed on the unencrypted outgoing data comprises steps of:
   identifying, in the unencrypted incoming data (DI_nc), a routing data structure;
   determining, from the routing data structure, a current location;
   determining, from the current location, a subsequent location;
   obtaining an identifier of the subsequent cryptographic processing module associated with the subsequent location.

5. The method according to claim 4, characterised in that the step of obtaining the encryption key (K_O) for the unencrypted outgoing data (DO_nc) comprises a step of obtaining the encryption key (K_O) from the identifier of the subsequent cryptographic processing module.

6. The method according to claim 1, characterised in that the step of obtaining the encryption key (K_O) for the unencrypted outgoing data (DO_nc) comprises a step of deriving the encryption key (K_O) from a master key, the deriving step taking into account a position of a subsequent cryptographic processing module in the chain of cryptographic processing modules.

7. The method according to claim 1, characterised in that it further comprises a step of transmitting encrypted outgoing data (D_B) to a subsequent cryptographic processing module in the chain of at least two cryptographic processing modules depending on at least one routing data item present in the incoming data (D_A) and/or the unencrypted incoming data (DI_nc).

8. The method according to claim 1, characterised in that the step of implementing the at least one cryptographic operation on the unencrypted incoming data (DI_nc), delivering the unencrypted outgoing data (DO_nc), consists in applying a cryptographic primitive.

9. A computer program product stored on a non-transitory computer-readable medium and executable by a microprocessor, comprising program code instructions to execute the data processing cryptographic method according to claim 1.

10. The method of claim 1, further comprising a step of determining a subsequent cryptographic processing module to be executed on the unencrypted outgoing data.

11. A cryptographic data processing device for implementing a cryptographic function, comprising a hardware processor, a memory, and a set of cryptographic processing modules, the device comprising a current cryptographic processing module from the set of cryptographic processing modules, the current cryptographic processing module belonging to a chain of at least two cryptographic processing modules executed for the implementation of the cryptographic function, the current cryptographic processing module comprising:
   software for receiving incoming data (D_A);
   software for determining a decryption key (K_I) to be applied to the incoming data (D_A) according to a master key and a position of the current cryptographic processing module;
   software for decrypting, with the key (K_I) for the incoming data (D_A), delivering unencrypted incoming data (DI_nc);
   software for implementing at least one cryptographic operation on the unencrypted incoming data (Di_nc), delivering unencrypted outgoing data (DO_nc);
   software for obtaining an encryption key (K_O) for the unencrypted outgoing data (DO_nc);
   software for encrypting the unencrypted outgoing data (DO_nc) with the previously determined encryption key (K_O) for the outgoing data, delivering the encrypted outgoing data (D_B), which may be intermediate data.

12. The device according to claim 11, further comprising software for determining a subsequent cryptographic processing module to be executed on the unencrypted outgoing data.

13. A cryptographic data processing method for implementing a cryptographic function, which method is implemented within an electronic data processing device comprising a processor, a memory and a set of cryptographic processing modules, the method comprising the following steps implemented by at least a current and a next cryptographic processing module executed for the implementation of the cryptographic function:

receiving, by the current cryptographic processing module, incoming data (D_A);

determining, by the current cryptographic processing module, a decryption key (K_I) to be applied to the incoming data (D_A) according to a master key and a position of the current cryptographic processing module, wherein the position of the current cryptographic processing module is a sequential position in the chain of at least two cryptographic processing modules;

decrypting, by the current cryptographic processing module, the incoming data (D_A) with the key (K_I), delivering unencrypted incoming data (DI_nc);

implementing, by the current cryptographic processing module, at least one first cryptographic operation of the cryptographic function on the unencrypted incoming data (Di_nc), delivering unencrypted outgoing data (DO_nc);

obtaining, by the current cryptographic processing module, an encryption key (K_O) for the unencrypted outgoing data (DO_nc);

encrypting, by the current cryptographic processing module, the unencrypted outgoing data (DO_nc) with the previously determined encryption key (K_O) for the outgoing data, delivering the encrypted outgoing data (D_B), which may be intermediate data;

receiving, by the next cryptographic processing module, the encrypted outgoing data (D_B), which are considered by this next cryptographic processing module as encrypted incoming data (D_B), intended to undergo at least one second cryptographic operation of the cryptographic function;

determining, by this next cryptographic processing module, a decryption key to be applied to these encrypted incoming data (D_B), according to the master key and the position of this next cryptographic processing module;

decrypting, by this next cryptographic processing module, these encrypted incoming data (D_B), by the next cryptographic processing module, with the corresponding decryption key, delivering unencrypted incoming data (D_B) intended to undergo the at least one second cryptographic operation;

implementing, by the next cryptographic processing module, at least one second cryptographic operation of the cryptographic function, on the unencrypted incoming data (D_B).

14. The method according to claim 13, wherein the position of this next cryptographic processing module is a sequential position in a chain of at least two cryptographic processing modules.

\* \* \* \* \*